(12) United States Patent
Flanagan

(10) Patent No.: US 9,900,784 B2
(45) Date of Patent: Feb. 20, 2018

(54) GEO-LOCATION IN A WIRELESS COMMUNICATION NETWORK

(71) Applicant: Viavi Solutions UK Limited, Berkshire (GB)

(72) Inventor: Michael Joseph Flanagan, Chester, NJ (US)

(73) Assignee: Viavi Solutions UK Limited, Berkshire (GB)

( * ) Notice: Subject to any disclaimer, the term of this patent is extended or adjusted under 35 U.S.C. 154(b) by 0 days.

(21) Appl. No.: 15/282,083

(22) Filed: Sep. 30, 2016

(65) Prior Publication Data

US 2017/0019798 A1    Jan. 19, 2017

Related U.S. Application Data

(62) Division of application No. 13/144,130, filed as application No. PCT/EP2010/000072 on Jan. 9, 2010, now Pat. No. 9,462,482.

(60) Provisional application No. 61/144,242, filed on Jan. 13, 2009.

(51) Int. Cl.

| | |
|---|---|
| *H04W 40/00* | (2009.01) |
| *H04W 16/18* | (2009.01) |
| *G01S 5/02* | (2010.01) |
| *H04W 64/00* | (2009.01) |
| *H04W 24/00* | (2009.01) |

(52) U.S. Cl.
CPC .............. *H04W 16/18* (2013.01); *G01S 5/02* (2013.01); *G01S 5/0278* (2013.01); *H04W 24/00* (2013.01); *H04W 64/006* (2013.01)

(58) Field of Classification Search
CPC ...................................................... H04W 16/18
See application file for complete search history.

(56) References Cited

U.S. PATENT DOCUMENTS

| | | | |
|---|---|---|---|
| 5,293,642 | A | 3/1994 | Lo |
| 6,263,208 | B1 | 7/2001 | Chang et al. |
| 7,406,320 | B1 | 7/2008 | Kumar et al. |
| 7,783,303 | B1 | 8/2010 | Lerner |
| 9,462,482 | B2 | 10/2016 | Flanagan |
| 2005/0131635 | A1 | 6/2005 | Myllymaki et al. |
| 2005/0243936 | A1 | 11/2005 | Agrawala et al. |
| 2005/0255854 | A1 | 11/2005 | Sillasto et al. |
| 2005/0255858 | A1 | 11/2005 | Stein |

(Continued)

OTHER PUBLICATIONS

International Search Report and Written Opinion corresponding to PCT/EP2010/000072, dated Aug. 2, 2010, 16 pages.

*Primary Examiner* — Justin Lee
(74) *Attorney, Agent, or Firm* — Harrity & Harrity, LLP

(57) ABSTRACT

A method for geo-location of a wireless communication unit (410) is provided. The communication unit (410) communicates with a wireless communication network (430) of a wireless communication system (400). A probability density function is derived for the location of the wireless communication unit (410), from measured information and/or information about the wireless communication network (430). The probability density function is sampled to provide spatial and probability information about each of at least two possible locations for the wireless communication unit (410). A wireless communication system (400) and a method of selecting enhancements to a wireless communication system (400) are also provided.

20 Claims, 7 Drawing Sheets

(56) References Cited

U.S. PATENT DOCUMENTS

| | | | |
|---|---|---|---|
| 2006/0234673 A1 | 10/2006 | Trux | |
| 2006/0287743 A1* | 12/2006 | Sampath | H04L 1/0026 |
| | | | 700/90 |
| 2006/0290568 A1 | 12/2006 | Sillasto | |
| 2007/0087738 A1 | 4/2007 | Melkesetian | |
| 2007/0121560 A1 | 5/2007 | Edge | |
| 2007/0168127 A1 | 7/2007 | Zaruba et al. | |
| 2008/0026768 A1* | 1/2008 | Fok | H04N 21/4126 |
| | | | 455/452.2 |
| 2008/0080429 A1 | 4/2008 | Hart | |
| 2008/0112309 A1* | 5/2008 | Hamaguchi | H04L 1/06 |
| | | | 370/208 |
| 2009/0325603 A1 | 12/2009 | Van Os et al. | |
| 2010/0048199 A1* | 2/2010 | Forslow | H04W 24/08 |
| | | | 455/423 |
| 2013/0288709 A1 | 10/2013 | Flanagan | |

* cited by examiner

GEO-LOCATION IN A WIRELESS COMMUNICATION NETWORK

CROSS-REFERENCE TO RELATED APPLICATIONS

This application is a divisional of U.S. patent application Ser. No. 13/144,130, filed Sep. 19, 2011 (now U.S. Pat. No. 9,462,482), which is a 371 application of PCT/EP2010/000072, filed Jan. 9, 2010, which claims priority under 35 U.S. C. § 119 to U.S. Provisional Patent Application No. 61/144,242, filed Jan. 13, 2009, the entire disclosures which are incorporated herein by reference.

FIELD OF THE INVENTION

Aspects of the invention relate to the geo-location of wireless communication units, and the planning of wireless networks.

The invention is applicable to mobile telephones. The invention is also applicable to other types of wireless digital communication units, including both personal digital assistants (PDAs) and laptop computers with wireless communications capability. The invention is not however limited to these applications.

BACKGROUND OF THE INVENTION

A wireless communication unit usually forms part of a wireless communication system. The wireless communication unit communicates through a wireless communication network, which also forms part of the wireless communication system.

The wireless communication network normally comprises a network of base stations. Each base station enables communication within an area referred to as a cell-site. Each cell-site may comprise multiple sectors. There are usually three sectors in a cell-site, each served by a dedicated antenna.

In some countries, it is a legal requirement that wireless communication systems be able to provide accurate information about the location of wireless communication units. This information may serve, for example, to expedite the arrival of assistance to a user of a wireless communication unit who calls the emergency services, using the '911' number in the United States.

Information about the location of a wireless communication unit can be derived in many ways. At any particular time, various forms of measurement information may be available from:

(i) The wireless communication unit;
(ii) The wireless communication network, and particularly from one or more base stations with which the wireless communication unit is communicating; or
(iii) Both of (i) and (ii).

This measurement information can be processed to provide an estimate of the location of the wireless mobile communication unit.

Considering the measurement information in more detail, this information may be available either:

(i) Directly. This means that the information is included in the measurement made. The measurement may be made either by the wireless communication unit, or by another part of the wireless communication system, such as the wireless network.

(ii) Indirectly. This means that the information is derived from the measurements made. An example would be an estimate of the distance between a wireless communication unit and the base station of a wireless communication system. Such an estimate might be calculated by multiplying the speed of propagation of the signal by a measured time difference between transmission and receipt of a signal.

So some or all of the following mobile measurement information may be available:

(i) The absolute distance(s) from the wireless communication unit to one or more network sectors.
(ii) Differential distances between the wireless communication unit and one or more pairs of network sectors.
(iii) Received signal powers recorded by the wireless communications unit from one or more network sectors.
(iv) Received signal-to-noise ratio measurements recorded by the wireless communication unit from one or more network sectors.

In addition, the following network information may be available:

(i) Antenna locations per sector. This information may be provided in latitude and longitude, or as 'Easting' and 'Northing' directions, or the equivalent.
(ii) Antenna properties. This information may include height above ground, azimuth, tilt, horizontal and vertical beam pattern, transmitted power levels for control and traffic channels.

A combination of the mobile measurement information and the network information is often used to provide geometric interpretations of the mobile device location.

So prior art geo-location methods have as their inputs various forms of directly- and indirectly derived measurement information. That measurement information may have come from the wireless communication unit, the wireless communication system, or both. Some wireless communication units may be able to provide further information that originates from direct communication links between the wireless communication unit and other wireless communication units. Such direct communication links do not pass through the wireless communication network.

FIG. 1 shows a simple example of a wireless communication system 100. Wireless communication unit 110 communicates with base station 120. Base station 120 is one of many base stations that together comprise the wireless communication system 100. Base station 120 is the nearest base station to wireless communication unit 110, and is located a distance 'R' from wireless communication unit 110.

FIG. 1 shows one problem with prior art geo-location methods. If the base station 120 has an omni-directional antenna, and no other measurement information is available, then any attempt to provide a single estimate of the location of the wireless communication unit 110 is very difficult. The information available from the wireless communication unit 110 and/or from base station 120 allows prior art geo-location methods to calculate only the absolute value of distance R. This distance is measured relative to the known location of base station 120, which might be at coordinates $(x_B, y_B)$. However, all that is known is that the wireless communication unit 110 is located somewhere on a circle of radius R, centred on $(x_B, y_B)$, which is the circle 130 in FIG. 1.

The single estimate of the location would have to be a point chosen at random on the circle 130. The error in this estimate could be up to 2R, because the wireless communication unit might in fact be located on circle 130 at a point diametrically opposite to the estimated location.

FIG. 2 considers another simple example of a wireless communication system 200. FIG. 2 also shows a wireless communication unit 210 and base station 220. Base station 220 has a directional antenna. It is statistically most likely that wireless communication unit 220 is being served by the main lobe 230 of the directional antenna. So a single estimate of the location of the wireless communication unit 210 can be made with greater certainty than was the case with the wireless communication system of FIG. 1. However, it is also possible, but less likely, that wireless communication unit 210 is being served by a 'side-lobe' or 'back-lobe' of the directional antenna. A back-lobe is shown as reference 240 in FIG. 2.

A prior art geo-location method would provide an estimate of the location of wireless communication unit 210 based on the distance R and the direction of the antenna's main lobe. This estimate is shown as point $(x_1, y_1)$ on FIG. 2. However, the wireless communication unit 210 might provide the same measurement information, such as a received signal to noise ratio, if it were in fact being served by the back-lobe 240 of the antenna. In this case, it would be located at a distance less than R from base station 220, in the opposite direction. Such a location is shown as point $(x_2, y_2)$ on FIG. 2, which is located 0.25R from base station 220. If wireless communication unit 210 were in fact located at point $(x_2, y_2)$, then the estimated location $(x_1, y_1)$ would be in error by a distance of 1.25R.

In general terms, prior art geo-location techniques usually deliver a single point in space as their estimate of the location of the wireless device. This point may, for example, be described by an x coordinate and a y coordinate, as in FIGS. 1 and 2. However, such an approach does not give the user information about the reliability of the estimate of the location. Reliability, in this example, means both 'accuracy' and 'precision'.

'Accuracy' concerns whether the estimated location is the correct one, or not. In the example of FIG. 1, it was explained that the measurement of the location of mobile communication unit 110 might be inaccurate by as much as 2R.

'Precision' is the exactness of the measurement. Both FIGS. 1 and 2 assumed that the distance R could be determined very precisely, i.e. that an exact value for R could be derived.

Both accuracy and precision depend on the type and quality of data on which the measurement estimate is based.

Whereas FIGS. 1 and 2 assumed that distance R could be determined reliably, there is in fact an error range associated with the measurement of R itself. The measurement of R is in fact imprecise.

FIG. 3 illustrates the imprecision in the measurement of R. FIG. 3 corresponds generally to the arrangement of FIG. 1. A base station 320 located at point $(X_B, Y_B)$ might measure the distance to a communication unit 310 as R. Circle 330 shows the locus of all points at the distance R, which is the distance from base station 320 at which the mobile is most likely to be located. Due to the measurement collection process, however, the user 310 might actually be at a distance of between (R−e1) and (R+e2) from base station 320. So it is not possible even to say with certainty that the user 310 lies on circle 330.

An error function describes the probability that communication unit 310 is located at each particular distance from base station 320. The error function is usually complex. The details of the error function can be determined through a variety of means. One option is to place calls from a small number of locations, and compare the measurement data with the known locations.

Summing up the discussion of FIGS. 1-3, there is both inaccuracy and imprecision in the measurement of the location of a mobile communications unit. So some degree of error is likely in the measurement of the position of a mobile communications unit in most cellular communications systems.

These problems are greatest in the unusual case of:

(i) A base station with an omni-directional antenna, such as in FIG. 1; and (ii) When received signal strength is the only measurement data on which an estimate of the position of the mobile communications unit can be made.

In the preceding discussion and the discussion that follows, the term 'communicating' includes a variety of forms of communication. These forms include, but are not limited to, speech or data communication sessions on traffic channels, and communication on the control channel. So, for example, the communication may not require the user of a mobile telephone to actually place or receive a call. The communication may involve, for example, only the intermittent receipt by a mobile telephone of data over the wireless communication system's control channel.

Prior art U.S. Pat. No. 5,293,642 (Lo) describes a variety of approaches to estimating the location of a mobile communication unit. The approaches involve calculating a probability density function for the location of the mobile communication unit. A mobile station may be in communication with two or more base stations. In this case, several probability density functions can be calculated, each describing the location of the mobile calculated from measurements received from one of the base stations. These probability density functions may be combined, to provide a joint probability density function. U.S. Pat. No. 5,293,642 (Lo) may employ any of the following data in calculating a location probability density function:

Radio attenuation from RSSI measurements at the mobile station;

Radio attenuation from RSSI measurements at the base stations;

Direction of signal arrival at the base station;

Radio propagation delay from mobile signal arriving at the base station; and

Mobile transmission timing alignment.

Prior art United States patent application US2008080429 (Hart) describes a process of minimum variance location estimation in wireless networks. A probability density function is calculated, and a 'probability surface' is derived from the probability density function. A mean location of a wireless node is calculated from the probability surface.

SUMMARY OF THE INVENTION

In accordance with a first aspect of the present invention, there is provided a method for geo-location of a wireless communication unit in accordance with the description herein.

In accordance with a second aspect of the present invention, there is provided a wireless communication unit or a wireless communication system in accordance with the description herein.

In accordance with a third aspect of the present invention, there is provided a method of selecting enhancements to a wireless communication system in accordance with the description herein.

In accordance with a fourth aspect of the present invention, there is provided a computer program product in accordance with the description herein.

In accordance with a fifth aspect of the present invention, there is provided a wireless communication system in accordance with the description herein.

The geo-location method of the invention provides information, as part of its output, about more than one possible location for a wireless communication unit. The method therefore may retain more of the information associated with the measurements on which the location estimates are based than was the case with prior art geo-location methods, and use this information in its output. The output from the method of the present invention may provide information about second and third, etc., most likely locations for a device, and/or may keep uncertainty information and present this as part of the output.

The invention may, for example, indicate that there are two possible locations for a wireless communication unit, and that one of the two locations has only a slightly higher probability of being correct than the other. The user of a mobile communication unit, or the operator of a wireless communication system, may react very differently to this information than would be the case with information from a prior art geo-location method.

The present invention may therefore offer a number of advantages, for example in:

(i) Providing 'real-time' information to a user of a wireless communication unit about that user's current location; or (ii) Searching for a user of a wireless communication unit who has requested emergency assistance.

The geo-location information provided by the present invention may also be used in 'post-processing'. Such processing may be carried out by, amongst others, the following:

(i) operators of wireless communication networks when analysing telecommunications traffic patterns;

(ii) the emergency services;

(iii) general location based services;

(iv) organisations that monitor levels and speeds of vehicular road traffic by tracking 'anonymised' mobile phone signals, for example to measure or forecast road traffic delays.

The results of such post-processing are themselves used in decision making. Such decisions include decisions about enhancing networks, for example by adding new base stations, or upgrading an antenna in a network sector. The method of selecting enhancements to a wireless communication system in accordance with the invention shows advantages over prior art arrangements, and may result in more effective upgrades to the network being made, when they are needed.

BRIEF DESCRIPTION OF THE DRAWINGS

Exemplary embodiments of the present invention will now be explained with reference to the accompanying drawings.

DESCRIPTION OF PREFERRED EMBODIMENTS

Figure 4:
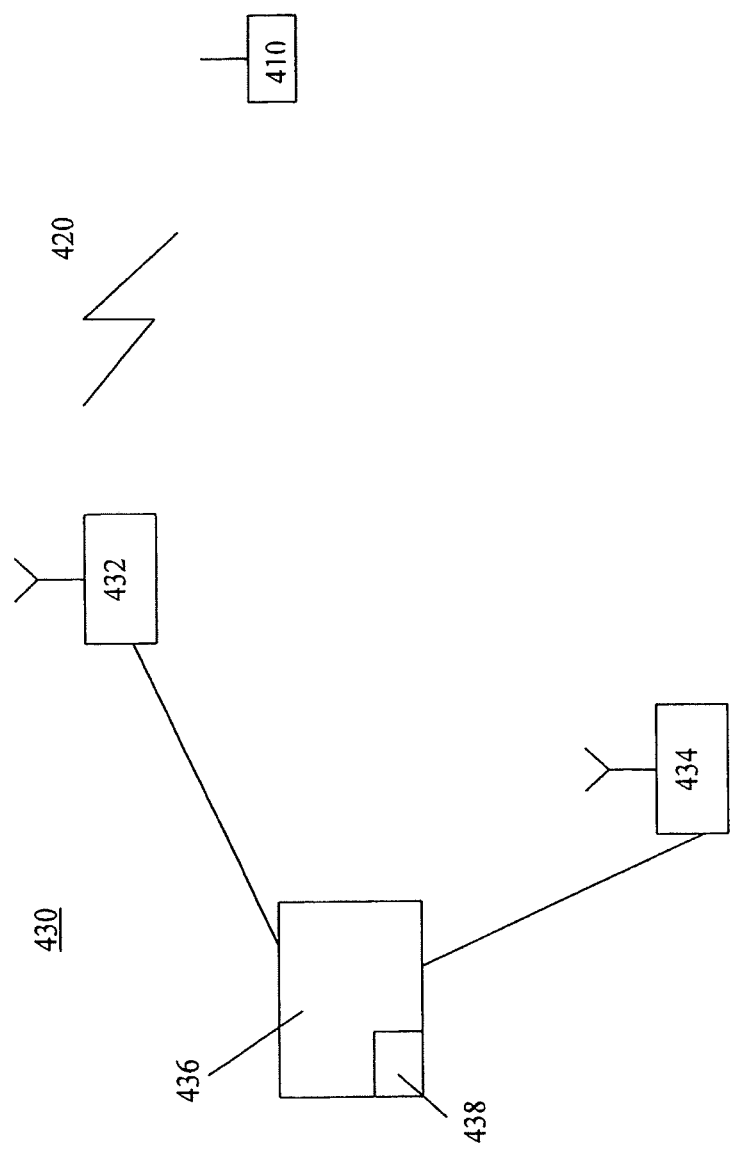
FIG. 4 shows an exemplary embodiment of a wireless communications system in accordance with the invention.

FIG. 4 shows an exemplary embodiment of a wireless communications system 400 in accordance with the invention.

Wireless communication unit 410 is connectable via a wireless communication link 420 to a wireless communication network 430 of wireless communication system 400. Base stations 432 and 434, and control unit 436 all form part of wireless communication network 430.

Communication link 420 may comprise a voice communication channel, or a data link.

In accordance with this exemplary embodiment of the invention, a probability density function is derived for the location of the wireless communication unit. The probability density function is derived from at least one of the group of:

(i) measurement information from the wireless communication unit 410;

(ii) network information about the wireless communication network 430.

The probability density function may be derived by one of several of the components of the wireless communication system 400. For example, a processor 438 located in control unit 436 may derive the probability density function.

The probability density function is sampled, to provide output information. This output information comprises both spatial information and probability information about each of at least two possible locations for the wireless communication unit 410. Sampling of the probability density function may also occur in processor 438.

In an alternative arrangement, the probability density function may be derived in a separate system, which is not shown on FIG. 4. Such a separate system is particularly likely to be used when the probability density function is derived as part of 'post-processing', which does not take place in real time. Such post-processing may be carried out in a dedicated system outside of wireless communication system 400, using records of one or more communication links or calls. In some applications, the post-processing will be applied to several records, or to a large number of records. Here the 'large number' may include many thousands or millions of call records. When the invention is performed by a separate system, one or more computer workstations may be used. These workstations may be dedicated to this task, which would be the usual approach. Alternatively, these workstations may perform other tasks, such as fault management or compiling switch statistics and maintenance reports, in addition to the present invention. These workstations may consist of general-purpose computers. However, they could also be composed of custom hardware, with specially-built printed-wiring cards & custom chips to accelerate the necessary calculations. Where all calls in a busy network are analysed, such a custom type arrangement may provide greater speed of implementation of the method.

One approach to implementing the invention would be simply to arrange for each of a group of mobiles of a mobile telephone system to provide data as an 'input'. The mobile telephones would provide their measurements to the Radio Access Network (RAN) of the mobile telephone system, which in turn provides the mobile measurements to the Operations Support System (OSS) of the mobile telephone system. The calculations necessary to perform the invention would be carried out in the Operations Support System (OSS). The Operations Support System of a mobile telephone system is normally connected directly to the Radio Access Network (RAN), so it is easy to arrange for the Operations Support System to receive measurements from the Radio Access Network.

The probability density function may be derived from at least two individual probability density functions, each individual probability density function being based on either:

(i) the measurement information from the wireless communication unit 410; or (ii) the network information about the wireless communication network 430.

Various techniques are available for calculating probability density functions. However, in accordance with the invention, the probability density function, or the two or more individual probability density functions, may be created by parametric modelling. The parametric modelling may use one or more moments of a random variable distribution. The probability density function thus created will be such that the summation of the probabilities of all possible locations equals unity.

The spatial information and probability information about each of the at least two possible locations for the wireless communication unit may advantageously comprise:

(i) an x-coordinate and a y-coordinate for each possible location; and (ii) a probability of the wireless communication unit 410 being located at the x-coordinate and y-coordinate, the probability being derived from the probability density function.

In order to make the output information from the invention more user-friendly, the possible locations for the mobile communication unit 410 with a probability less than a threshold value may be eliminated. This can be done, for example, using importance sampling. The output information would then comprise a list of all the possible locations for the wireless communication unit 410 with a probability greater than or equal to the threshold value. The user of the wireless communication unit 410 may be able to select how many possible locations for the wireless communications unit are included in the output information.

The output information of the invention may serve a wide variety of uses. However, the output information may be displayed on a screen of the wireless communication unit 410. In an alternative arrangement to that described above, it is also possible for the wireless information unit 410 to calculate the probability density function, rather than this being a function of the wireless communication network 430.

The invention may be arranged to operate with measurement information from the wireless communication unit 410 that comprises one or more of the following:

(i) one or more absolute distances from the wireless communication unit 410 to one or more network sectors of the wireless communication network 430;

(ii) one or more differential distances between the wireless communication unit 410 and one or more pairs of network sectors of the wireless communication network 430;

(iii) one or more received signal powers recorded by the wireless communication unit 410 from one or more network sectors of the wireless communication network 430; and (iv) one or more measurements of the received signal-to-noise ratio recorded by the wireless communication unit 410 from one or more network sectors of the wireless communication network 430.

In addition, the invention may be arranged to operate with network information about the wireless communication network 430 that comprises one or more of the following:

(i) antenna or base station location information;

(ii) antenna properties;

(iii) azimuthal and tilt pointing angles of a sector antenna;

(iv) transmitted power levels.

Figure 5:
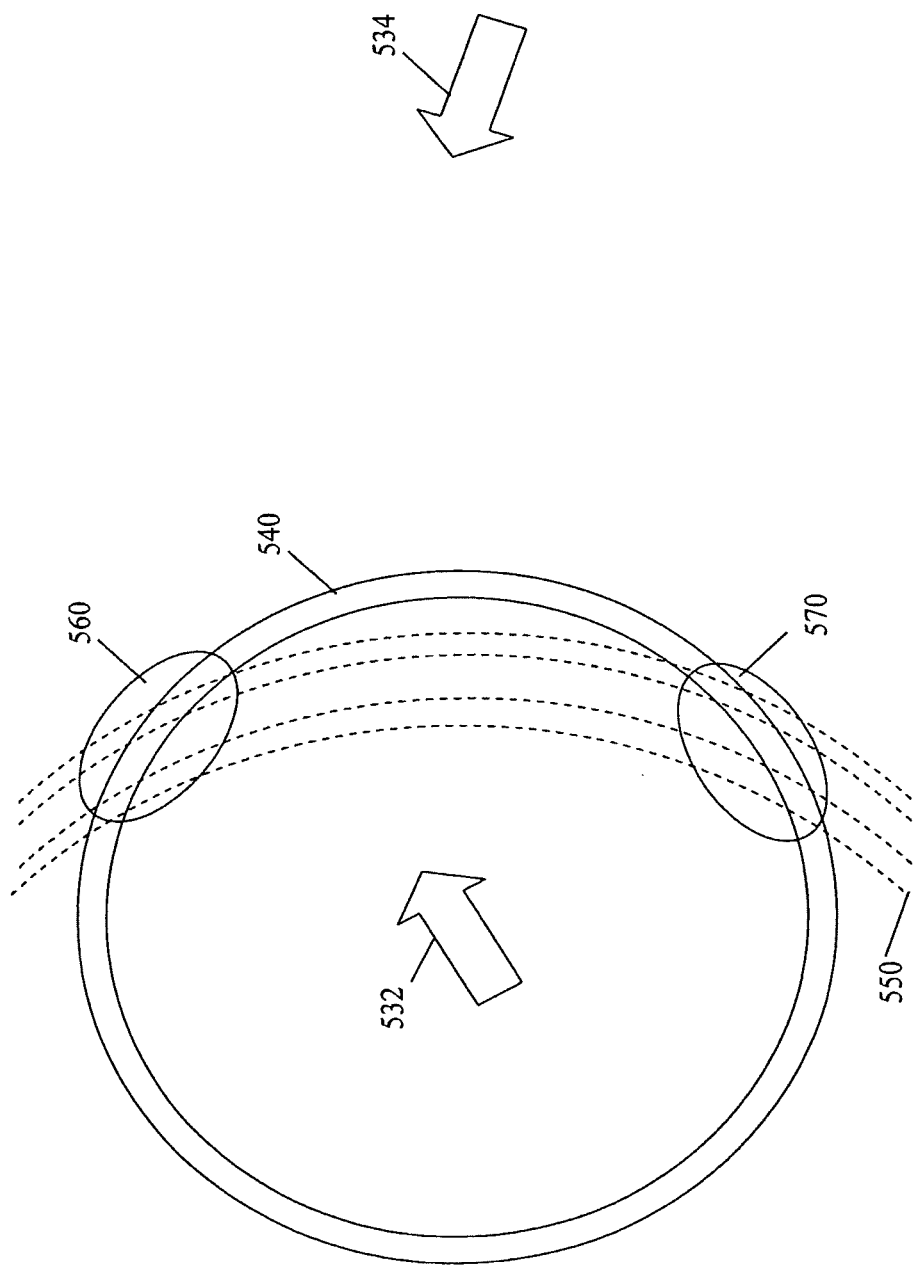
FIG. 5 shows an exemplary embodiment of a method of geo-location in accordance with the invention.

FIG. 5 shows an exemplary embodiment of a method of geo-location in accordance with the invention.

FIG. 5 shows first and second antennae 532, 534, which are part of two base stations such as base stations 432 and 434 of FIG. 4. First and second antennae 532, 534 are sectorised antennae. First antenna 532 is located in a first sector, and second antenna 534 is located in a second sector.

Each of first and second antennae 532 and 534 focuses its transmitted energy. This focussing is such that most of the energy falls within a certain range of angles of azimuthal beam width. The range might be, typically, 45 to 90 degrees, centred about the azimuthal pointing angle. The direction of each of the arrows 532, 534 in FIG. 5 shows the azimuthal pointing angle for that antenna.

Assume now that a wireless communications unit, such as unit 410 shown in FIG. 4, performs a first measurement, which is of the distance to first antenna 532. The first measurement may be either a direct or an indirect measurement. FIG. 5 has been provided to illustrate the probability information that is available from a wireless communications unit whose location is uncertain, so no wireless communications unit is actually shown on FIG. 5.

Figure 1:
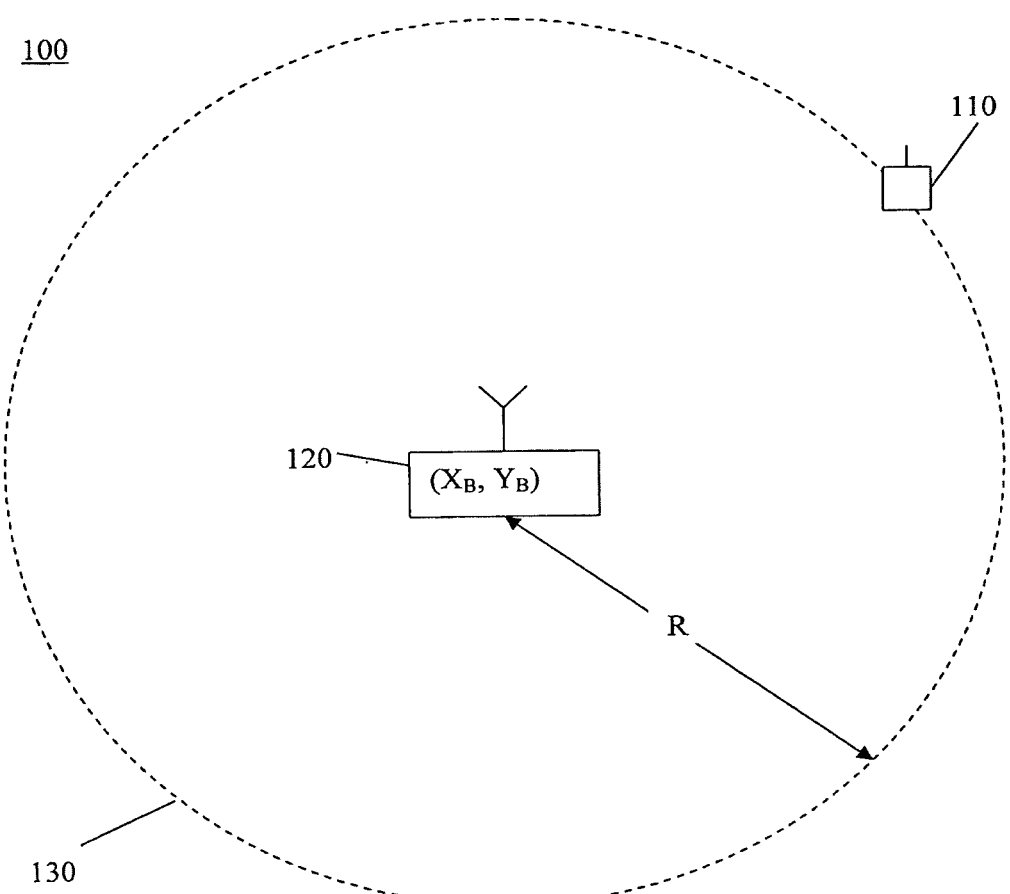
FIGS. 1-3 show wireless communication systems, and illustrate the limitations of prior art geo-location methods.
Figure 2:
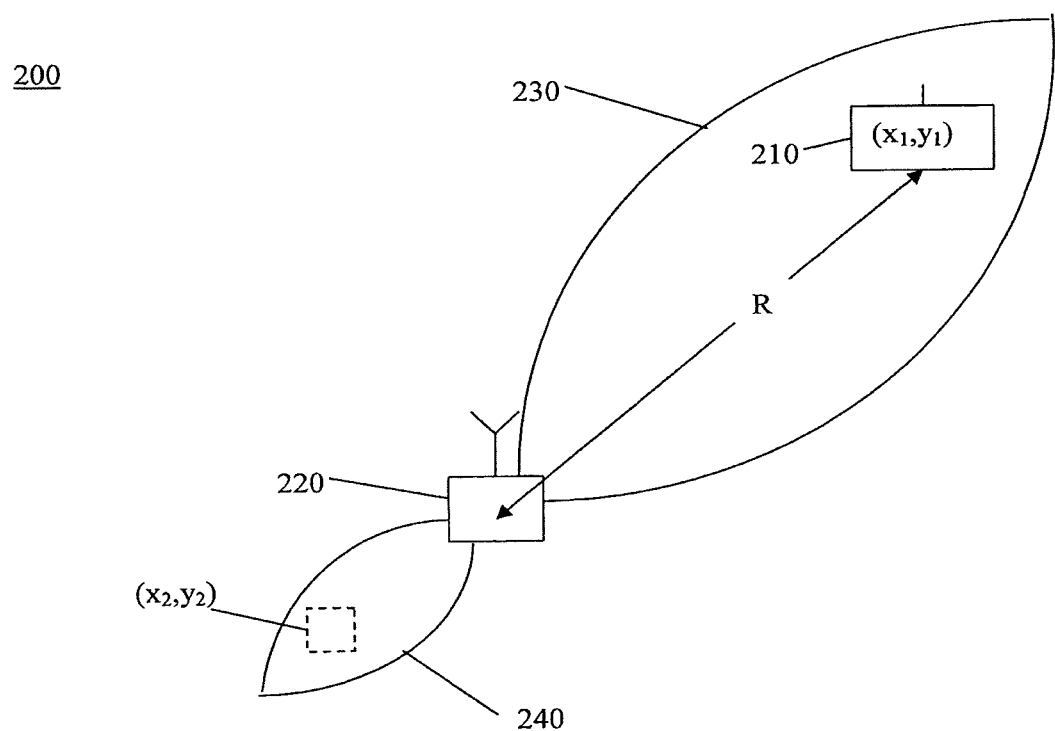
Figure 3:
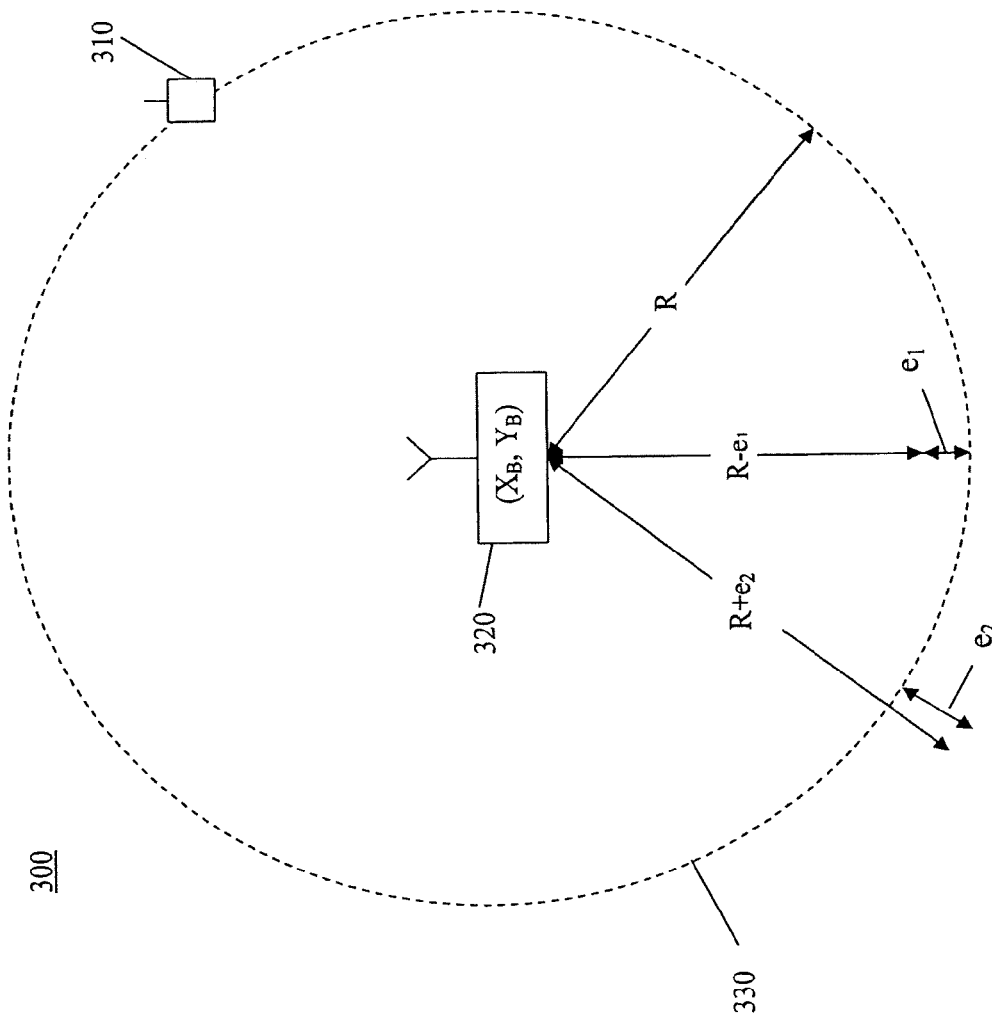

The first measurement results in a first probability density function. The solid double circle 540 illustrates the probability information, which is derived from the first probability density function. First antenna 532 lies at the centre of both of the circles 540. The double circle 540 corresponds to two contours of equal probability of finding the wireless communications unit. This measurement is generally similar to that described in connection with FIG. 3. The two lines of double circle 540 may, for example, correspond to distances R+e and R−e in FIG. 3.

The mobile communications unit is also able to perform a second measurement, which is of the distance to the second antenna 534 in FIG. 5. However, the second measurement yields a differential distance measure, relative to the first sector that contains first antenna 532. The differential distance measure might be obtained from the Time Difference of Arrival, the 'TDOA', of communication signals. The second measurement provides a second probability density function. The four dotted lines generally indicated by reference 550 in FIG. 5 illustrate probability information, which is derived from the second probability distribution function. The four dotted lines are contours of equal probability, and each takes the form of a hyperbola. The geometrical parameters of the hyperbola depend on the locations of the first and second sectors, and the differential distance quantity.

Both double circle 540 and the four hyperbolae 550 are in fact a dense sampling of points from their respective probability density functions.

In order to locate the wireless communication unit, it is necessary to combine the first and second probability density functions. This is because the probability of the wireless communication unit being at a particular location is the conjunction of independent events, i.e.:

(i) The mobile communication unit being located a distance from antenna 532 corresponding to approximately the radius of one of the circles 540;

(ii) A Time Difference of Arrival of a given value; and (iii) Mobile visibility of the first and second sectors.

The first and second probability density functions need to be suitably scaled when making this combination.

The example of FIG. 5 shows directional antennae in each sector. In this case, the most precise information is derivable by combining the first and second probability density functions with the probability density functions associated with the antennae. This is because users are more likely to be served in the main lobe of each antenna than either in the back lobe, or in a side lobe of the antenna. If both first and second antennae had been identical omnidirectional antennae, there would be no need to include their probability density functions in the combination.

The possible locations for the wireless communications unit are in first and second ovals 560 and 570. These show the locations where the combined probability density functions lead to the highest probability values.

In prior art geo-location approaches, the usual output would be a single point towards the centre of first oval 560. The point would be in first oval 560, because of the pointing angles of the antennae. Providing only the single point in first oval 560 as an output would discard useful information about the geo-location process, and limit its utility. For example, the probability of being at each possible location in second oval 570 might be nearly equal to the probability of being in corresponding points in upper oval 560, but that information would be discarded by prior art approaches.

When the emergency services locate a user, for example, it is valuable for them to know if there is more than one very likely location that requires their attention. The present invention provides that information. The prior art method would not.

Figure 6:
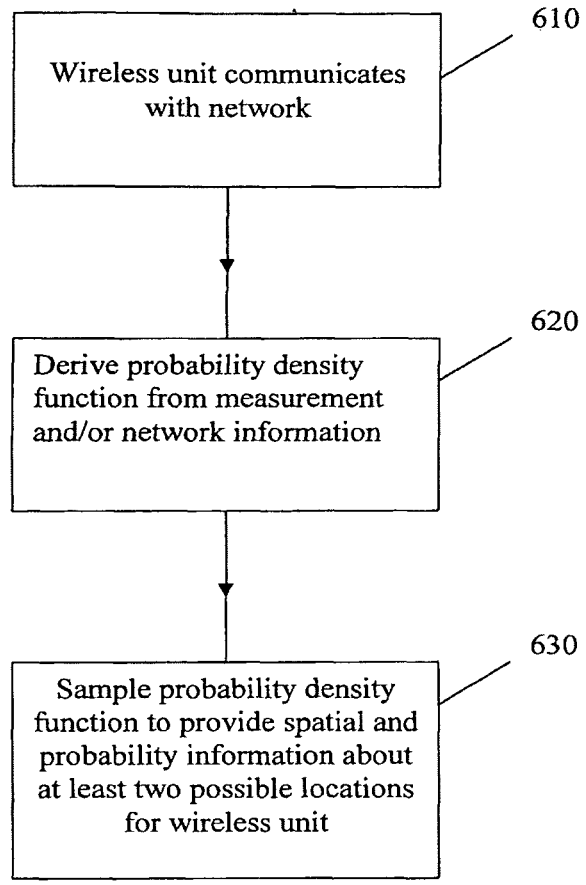
FIG. 6 shows a flowchart for a method for geo-location of a wireless communication unit in accordance with the invention.

The invention therefore provides a method for geo-location of a wireless communication unit 410. The steps of the method are summarised in the flowchart 600 of appended FIG. 6. In step 610, the wireless communication unit 410 communicates with the wireless communication network 430. In step 620, a probability density function is derived from measurement and/or network information. In step 630, the probability density function is sampled, to provide spatial and probability information about at least two possible locations for a wireless communication unit 410.

Figure 7:
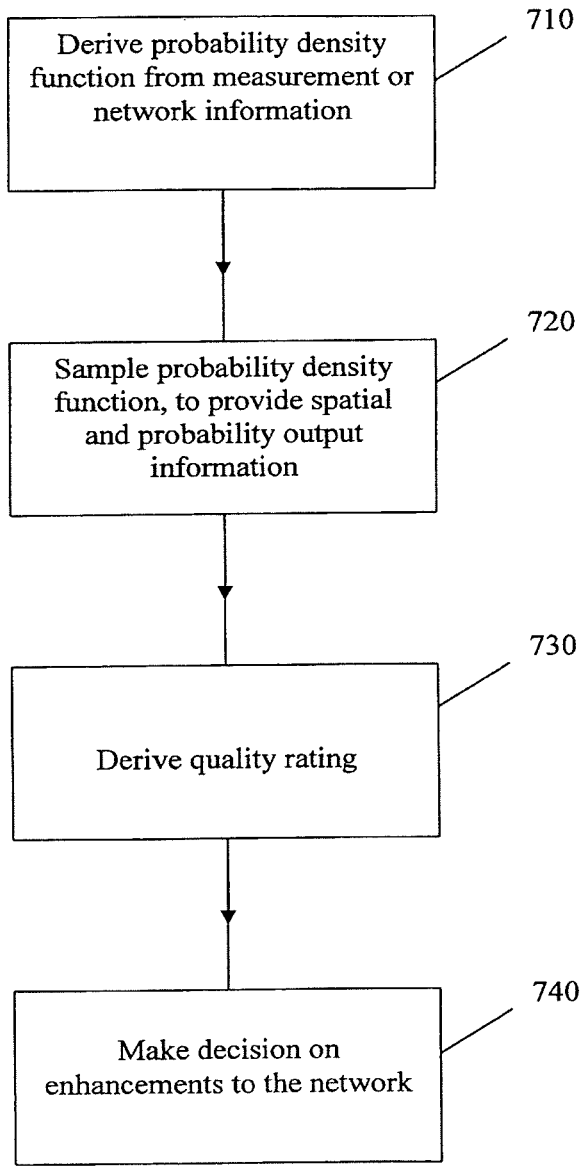
FIG. 7 shows a flowchart for a method of selecting enhancements to a wireless communication system in accordance with the invention.

The invention also provides a method of selecting enhancements to a wireless communication system 400. An exemplary method in accordance with the invention is shown in flowchart 700 of FIG. 7.

Step 710 of the method of the invention comprises deriving a probability density function for a location of a wireless communication unit 410, from at least one of the group of:

(i) measurement information from the wireless communication unit 410;

(ii) network information about the wireless communication network 430.

Step 720 comprises sampling the probability density function to provide output information, the output information comprising spatial information and probability information about the location of the wireless communication unit 410.

Step 730 comprises deriving a quality rating for the wireless communication link between the wireless communication unit 410 and the wireless communication network 430.

Step 740 comprises using the output information and the quality rating in a decision on enhancements to the wireless communication system 400.

The decision in step 740 on enhancements to the wireless communication system 400 may employ output information and quality ratings derived from many wireless communication units 410 and/or many wireless communication links. Generally, output information or quality ratings derived from larger numbers of units or links will lead to better decisions.

The decision in step 740 on enhancements to the wireless communication system 400 may comprise at least one from the group of:

(i) Deciding to re-direct an antenna in a base station 432, 434 of the wireless communication network 430;

(ii) Deciding to upgrade an antenna in a base station 432, 434 of the wireless communication network 430;

(iii) Deciding to change the transmission power level of an antenna in a base station 432, 434 of the wireless communication network 430.

Alternatively, or in addition, the decision 740 on enhancements to the wireless communication system 400 may comprise at least one from the group of:

(i) Choosing a site for an additional base station in the wireless communication network;

(ii) Re-locating an existing base station 432, 434 to a new site; or (iii) Moving a mobile or temporary base station.

The quality rating may be derived from at least one from the group of:

(i) Data about the number of times when it was not possible to establish a communication link 420, and/or data about the number of times that the communication link 420 breaks;

(ii) Data about the number of times when it was not possible to place a call and/or data about the rate of calls being dropped during the call;

(iii) One or more received signal powers recorded by the wireless communication unit 410 from network sectors of the wireless communication network 420;

(iv) One or more measurements of the received signal-to-noise ratio recorded by the wireless communication unit 410 from network sectors of the wireless communication network.

It will be appreciated that, for clarity purposes, the above description has described embodiments of the invention with reference to different functional units. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. Aspects of the invention may optionally be implemented, at least partly, as computer software running on one or more data processors and/or digital signal processors. Thus, the elements and objects of an embodiment of the invention may be physically, functionally and logically implemented in any suitable way. Indeed, the functionality may be implemented in a single unit, in a plurality of units or as part of other functional units.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with embodiments of the invention.

Additionally, although individual features may be included in different claims, these may possibly be advantageously combined, and the inclusion in different claims does not imply that a combination of features is not feasible and/or advantageous. Also, the inclusion of a feature in one category of claim does not imply a limitation to this category, but rather the feature may be equally applicable to other claim categories, as appropriate.

The order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A method comprising:
    determining a probability density function, for a location of a wireless communication unit, from at least one of:
        measurement information from the wireless communication unit,
            the wireless communication unit being connected via a wireless communication link to a wireless communication network, or
        network information associated with the wireless communication network;
    sampling the probability density function to provide output information,
        the output information indicating, for each of at least two possible locations of the wireless communication unit, spatial information for a possible location and a probability the wireless communication unit is at the possible location,
            the at least two possible locations including a first possible location served by a first lobe of a directional antenna and a second possible location served by a second lobe of the directional antenna;
    determining a quality rating for the wireless communication link between the wireless communication unit and the wireless communication network; and
    applying the output information and the quality rating in a decision on a plurality of enhancements to a wireless communication system,
        the wireless communication system comprising the wireless communication unit and the wireless communication network.

2. The method of claim 1, where applying the output information and the quality rating comprises:
    applying the output information and the quality rating from at least one of the wireless communication unit or the wireless communication link in the decision on the plurality of enhancements to the wireless communication system.

3. The method of claim 1, where the decision on the plurality of enhancements to the wireless communication system comprises:
    deciding to re-direct an antenna in a base station of the wireless communication network;
    deciding to upgrade the antenna in the base station of the wireless communication network; or
    deciding to change a transmission power level of the antenna in the base station of the wireless communication network.

4. The method of claim 1, where the decision on the plurality of enhancements to the wireless communication system comprises at least one of:
    choosing a site for an additional base station in the wireless communication network;
    re-locating an existing base station to a new site; or
    moving a mobile or temporary base station.

5. The method of claim 1, where determining the quality rating is based on:
    information identifying a quantity of times when establishing a communication link was not possible;
    information identifying a quantity of times that the communication link breaks;
    information identifying a quantity of times when placing a call was not possible;
    information identifying a rate of calls being dropped;
    one or more received signal powers recorded by the wireless communication unit from a plurality of network sectors of the wireless communication network; or
    one or more measurements of received signal-to-noise ratios recorded by the wireless communication unit from network sectors of the wireless communication network.

6. The method of claim 1, where the method is to be performed on the wireless communication unit.

7. A wireless communication system, comprising:
    one or more processors to:
        derive a probability density function, for a location of a wireless communication unit, from at least one of:
            measurement information from the wireless communication unit,
                the wireless communication unit being connected via a wireless communication link to a wireless communication network, or
            network information associated with the wireless communication network;
        sample the probability density function to provide output information,
            the output information indicating, for each of at least two possible locations of the wireless communication unit, spatial information for a possible location and a probability the wireless communication unit is at the possible location,
                the at least two possible locations including a first possible location served by a first lobe of a directional antenna and a second possible location served by a second lobe of the directional antenna;
        rate a quality of the wireless communication link between the wireless communication unit and the wireless communication network;
        provide a quality rating based on the quality of the wireless communication link; and
        select a plurality of enhancements to the wireless communication system based on the output information and the quality rating,
            the wireless communication system comprising the wireless communication unit and the wireless communication network.

8. The wireless communication system of claim 7, where the one or more processors, when selecting the plurality of enhancements to the wireless communication system, are to:
    select the plurality of enhancements to the wireless communication system based on the output information and the quality rating from the wireless communication unit and the wireless communication link.

9. The wireless communication system of claim 7, where the one or more processors, when selecting the plurality of enhancements to the wireless communication system, are to:
 decide to re-direct an antenna in a base station of the wireless communication network.

10. The wireless communication system of claim 7, where the one or more processors, when selecting the plurality of enhancements to the wireless communication system, are to:
 decide to upgrade an antenna in a base station of the wireless communication network.

11. The wireless communication system of claim 7, where the one or more processors, when selecting the plurality of enhancements to the wireless communication system, are to:
 decide to change a transmission power level of an antenna in a base station of the wireless communication network.

12. The wireless communication system of claim 7, where the one or more processors, when rating the quality of the wireless communication link, are to:
 rate the quality of the wireless communication link based on information associated with a quantity of times when establishing a communication link was not possible and a quantity of times that the communication link breaks.

13. The wireless communication system of claim 7, where the one or more processors, when rating the quality of the wireless communication link, are to:
 rate the quality of the wireless communication link based on information associated with a quantity of times when placing a call was not possible and a rate of calls being dropped.

14. A non-transitory computer-readable medium storing instructions, the instructions comprising:
 one or more instructions that, when executed by one or more processors, cause the one or more processors to:
  determine a probability density function, for a location of a wireless communication unit, from at least one of:
   measurement information from the wireless communication unit,
    the wireless communication unit being connected via a wireless communication link to a wireless communication network, or
   network information associated with the wireless communication network;
  sample the probability density function to provide output information,
   the output information indicating, for each of at least two possible locations of the wireless communication unit, spatial information for a possible location and a probability the wireless communication unit is at the possible location,
   the at least two possible locations including a first possible location served by a first lobe of a directional antenna and a second possible location served by a second lobe of the directional antenna;
  rate a quality of the wireless communication link between the wireless communication unit and the wireless communication network;
  provide a quality rating based on the quality of the wireless communication link; and
  apply one or more enhancements to a wireless communication system based on the output information and the quality rating,
   the wireless communication system comprising at least one of the wireless communication unit or the wireless communication network.

15. The non-transitory computer-readable medium of claim 14, where the one or more instructions, that cause the one or more processors to apply of the one or more enhancements to the wireless communication system, cause the one or more processors to:
 choose a site for an additional base station in the wireless communication network.

16. The non-transitory computer-readable medium of claim 14, where the one or more instructions, that cause the one or more processors to apply the one or more enhancements to the wireless communication system, cause the one or more processors to:
 re-locate an existing base station to a new site.

17. The non-transitory computer-readable medium of claim 14, where the one or more instructions, that cause the one or more processors to apply of the one or more enhancements to the wireless communication system, cause the one or more processors to:
 move a mobile or temporary base station.

18. The non-transitory computer-readable medium of claim 14, where the one or more instructions, that cause the one or more processors to rate the quality of the wireless communication link, cause the one or more processors to:
 rate the quality of the wireless communication link based on one or more received signal powers recorded by the wireless communication unit from a plurality of network sectors of the wireless communication network.

19. The non-transitory computer-readable medium of claim 14, where the one or more instructions, that cause the one or more processors to rate the quality of the wireless communication link, cause the one or more processors to:
 rate the quality of the wireless communication link based on one or more measurements of received signal-to-noise ratios recorded by the wireless communication unit from a plurality of network sectors of the wireless communication network.

20. The non-transitory computer-readable medium of claim 14, where the one or more instructions are to be performed on the wireless communication unit.

* * * * *